April 15, 1969  L. L. PACKER ET AL  3,438,365
RADIOACTIVE SEED CONTAINING XENON GAS FOR MEDICAL TREATMENT
Filed March 1, 1965

INVENTORS
LOUIS L. PACKER
ROBERT D. McKENZIE
JOSEPH P. HALEY
BY Donald J. Bradley
ATTORNEY

United States Patent Office 3,438,365
Patented Apr. 15, 1969

3,438,365
RADIOACTIVE SEED CONTAINING XENON
GAS FOR MEDICAL TREATMENT
Louis L. Packer, Hazardville, and Robert D. McKenzie, East Hartford, Conn., and Joseph P. Haley, Springfield, Mass., assignors to United Aircraft Corporation, East Hartford, Conn., a corporation of Delaware
Filed Mar. 1, 1965, Ser. No. 436,061
Int. Cl. A61j 1/00; G21h 5/00; A61m 31/00
U.S. Cl. 128—1.2                                            4 Claims

ABSTRACT OF THE DISCLOSURE

A radioactive seed for treatment of living tissue comprising a radioactive xenon gas encapsulated in a thin walled hollow cylindrical thermoplastic tube which is heat sealed at its ends.

---

This invention relates to radioactive xenon implantation seeds specifically adapted for use in cancer radiation therapy, and particularly to the structure, method of manufacture, and use of such seeds.

The objective of cancer radiation therapy is to destroy the cancerous tissue by providing optimum irradiation of cancerous tissue with the least irradiation of normal tissue. A classic method of achieving a high ratio of absorbed dose between cancerous and normal tissue is by permanently implanting a radioactive seed within the cancerous tissue. A point source location of a radioactive material within the cancerous tissue results in a contact radiation dosage which decreases as a function of the square of the distance from the source. Doses of 1000 roentgens can be delivered one centimeter from the implanted radioactive seed, while at a distance ten centimeters away the dosage is but ten roentgens.

Studies have shown that a radiation dose of about 1000 roentgens per seed is required to achieve the desired therapeutic action upon cancer tissue. Up to 100 seeds or more can be used in a single treatment. The seed must contain a material which is not chemically toxic to the body, it must be encapsulated in a material which is not rejected by the body, and the seed must also be small enough so that a minimum of trauma is produced. Other factors pertinent to the choice of materials are the electromagnetic energy emitted from the seed, the cost of the seed, the half-life of the radioactive material, and the radiation shielding problems associated with preparing and handling the seed.

This invention describes a novel radioactive implantation seed which utilizes the desirable characteristics of xenon 131 or xenon 133, or combinations thereof. The radioactive xenon may be incorporated into a solid material, or sealed in gaseous form in a heat sealable thermoplastic tubing such as nylon or "Kel-F." The radioactive xenon gas is sealed within the tubing by a novel sealing system. A novel gas transfer system utilizes cryogenic pumping.

It is therefore an object of this invention to produce radioactive implantation seeds in which xenon is the radioactive element.

Another object of this invention is a radioactive seed containing xenon gas incorporated in a heat-sealable thermoplastic tubing.

A further object of this invention is a radioactive seed containing xenon gas incorporated into a solid material.

Another object of this invention is a novel radioactive implantation seed in which the radioactive gas is transferred into the enclosure material by means of cryogenic pumping.

A further object of this invention is a novel radioactive seed fabrication system for enclosing radioactive xenon in a thermoplastic tubing.

A still further object of this invention is a novel method of treatment for cancer in which radioactive xenon seeds are implanted permanently within the cancerous tissue.

These and other objects of the invention may be better understood by referring to the following description and claims, read in conjunction with the accompanying drawings, in which:

The use of permanent implantation therapy for cancer has been severely handicapped both by the high cost of seeds and by the danger of radiation exposure to operating room and nursing personnel during actual implantation of high energy seeds, such as radon 222, and subsequent recovery of the patient. This exposure problem has also resulted in a reluctance on the part of the medical profession to utilize implantation therapy.

This invention avoids the disadvantages of the prior art by utilizing a radioactive isotope in which the low electromagnetic energy emissions permit adequate handling and exposure protection by a minimum of lead shielding. In addition, a novel method for encapsulating the isotopes, xenon 131 or xenon 133, into a low-cost thermoplastic material or a solid material enables seeds to be produced at an extremely low cost. Furthermore, the desirable half-lives of the isotopes xenon 131 and xenon 133 provide a desirable compromise between long shelf life and radiation exposure problems.

Table I lists some of the intrinsic pertinent properties of radon, gold, iridium and xenon that are of prime interest in permanent implantation seeds.

TABLE I.—PERMANENT IMPLANTATION SEED PROPERTIES

| Isotope | Half-life (day) | Electro-magnetic energy (mev.) | Shielding half-value layer (mm./Pb) | Approximate cost per seed |
|---|---|---|---|---|
| Radon 222 | 3.8 | 0.61 | 12 | $5.00 |
|  |  | 1.12 |  |  |
|  |  | 1.76 |  |  |
|  |  | (¹) |  |  |
| Gold 198 | 2.7 | 0.412 | 3 | 1.00 |
| Iridium 192 | 74 | 0.296 | 3 | 0.80 |
|  |  | 0.316 |  |  |
|  |  | 0.468 |  |  |
|  |  | 0.605 |  |  |
|  |  | (²) |  |  |
| Xenon 133 [3] | 5.3 | 0.081 | 0.530 | 2.00 |
|  |  | 0.031 | 0.027 |  |
| Xenon 131 [4] | 12 | 0.164 | 0.360 | 2.00 |
|  |  | 0.030 | 0.027 |  |

[1] 14 others to 2.4.
[2] 7 others to 0.660.
[3] The internal conversion ratio of xenon 133 is 2.
[4] The internal conversion ratio of xenon 131 is 27.

The shielding half-value layer for the emitted electromagnetic radiation from the xenon isotopes is significantly less than that of the other isotopes. In addition, because of the high internal conversion ratio of xenon 131 and xenon 133 radiation shielding requirements are greatly reduced.

The other isotopes, radon 222, gold 198, and iridium 192 listed in Table I are not as desirable for seed implants for various reasons. The 74-day half-life and high shielding requirements of iridium 192 have resulted in Atomic Energy Commission restrictions on the use of this isotope for permanent implantation. Gold 198 is limited in shelf-life availability because of the short 2.7 day half-life. Radon 222 seeds cost $5 per seed and as many as 100 seeds are used in a lung implant, and because of the very high electromagnetic energies emitted, heavy radiation shielding is required.

The xenon isotope used is usually purchased in gas form. Both xenon 131 and xenon 133 are produced in a nuclear reactor by the fission of uranium.

Figures 1A, 1B, 4, 4A, 4B:
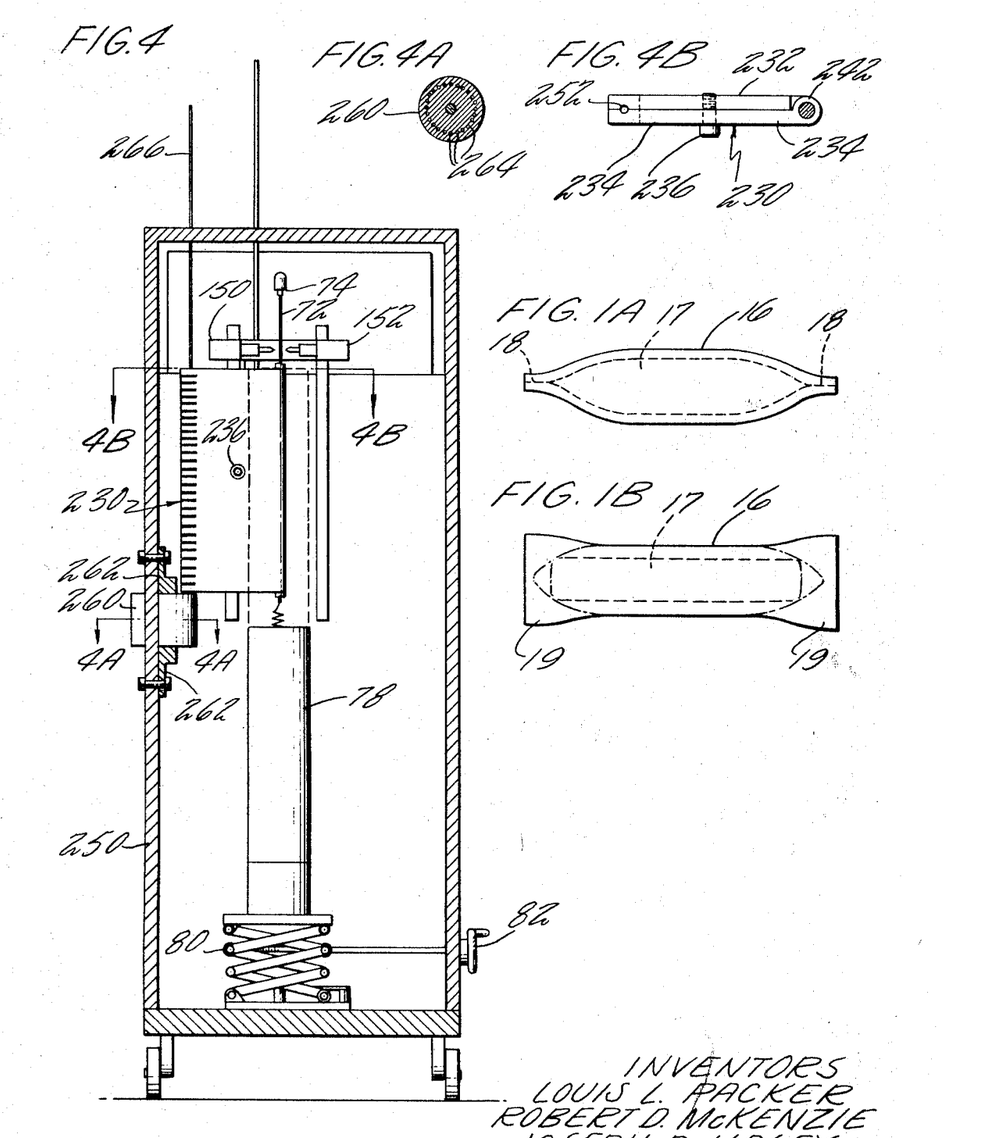
FIGURES 1A and 1B show in detail a seed containing xenon gas.
FIGURE 4 is an end view of the apparatus of FIGURE 3.
FIGURES 4A and 4B are sections taken respectively along lines AA and BB of FIGURE 4.

To produce a dose of 1000 roentgens, the radioactive xenon 133 seed must contain at the time of implantation at least 10 millicuries of activity. The gas is encapsulated, as shown in FIGURE 1, in seeds small enough to prevent trauma. The seeds are generally approximately 1 mm. in diameter and 4 mm. long. Each wall is approximately 0.15 mm. thick, leaving an inside diameter of 0.7 mm. The internal volume is approximately 1 cubic mm. These encapsulation dimensions are based on a size compatible with present seed implantation equipment, and are not critical.

In FIGURE 1 is shown the details of a typical finished seed. The seed walls 16 are formed from a thermoplastic such as nylon. The desired quantity of radioactive gas 17 is pumped into the thermoplastic tubing as will be described, and the tubing is heat sealed at both ends as shown at 18. The heat sealing is performed by a pair of impulse heaters, similar to soldering irons, which apply sufficient heat to the tubing to cause the walls to adhere in a gas-tight seal. This sealing method results in the widening of ends of the seed in the form of fishtails 19. The fishtails are not detrimental to the implanting of the seeds, since they act as stabilizers and guide the seed as it is being implanted. However, the fishtails may be removed by cutting to thereby streamline the seeds.

The constraints imposed by the seed dimension and specific activity, i.e. the amount of radioactive xenon present per unit volume of the gas, establish the requirements for seed fabrication methods. Specific activity is expressed in curies or millicuries per cm.$^3$ at standard temperature and pressure, 0° C. and 760 mm. of mercury. Seed volumes depend upon wall thickness and sealing methods. For the seed dimensions given above, xenon 133 which is available at a specific activity of 20–30 curies per cm.$^3$ at standard temperature and pressure, can be fabricated to obtain a seed activity of 10 millicuries even assuming a 5-day lapse in time for fabrication and handling. The specific activity of xenon 131 when produced in high specific activity lots should be in the range of 20 to 40 curies per cm.$^3$ at standard temperature and pressure.

For permanent implants a short half-life material is desirable. With xenon 133, one-half the dose of radioactivity will be delivered to the patient 5.3 days after implantation. 75% of the total dosage will be delivered in 10.6 days, and ⅞ of the dose will be delivered in 15.9 days. If the dosage is 10 millicuries at the time of implant, approximately 1.25 millicuries will remain after 15.9 days, and while this is a significant radioactive level, a thin lead bandage around the patient will be sufficient to shield others from the radioactivity. Since a patient is in the hospital 12 to 15 days after major lung surgery, there would appear to be little problem with radiation shielding.

If the xenon is originally encapsulated in the seed with a specific activity of 20 millicuries per cm.$^3$ at a pressure of 1000 mm., with a 5-day shelf-life the seed will be at the proper dosage, i.e. 10 millicuries per seed, when implanted. If a shelf-life of 10 days appears desirable, twice the activity of radioactive xenon can be encapsulated within the seed at a pressure of 2000 mm. This will produce a seed with a specific activity of 40 millicuries per cm.$^3$ initially, and after 10.6 days two half-lives will have occurred, the specific activity then being 10 millicuries. The requirements of plastic heat-sealed seeds appear to limit the pressure to about 3000 mm. at present.

Figure 2:
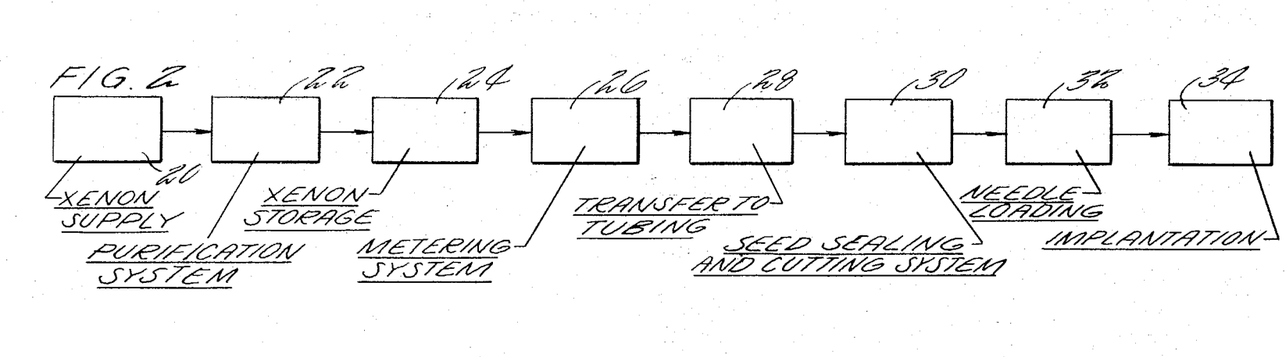
FIGURE 2 is a block diagram showing schematically the preferred system for preparing a seed.

FIGURE 2 is a block diagram of the xenon seed preparation system. The radioactive xenon will generally be obtained in a metal gas shipping container shown as xenon supply 20. The entire xenon supply can be used at one time, but it is preferred that the xenon be metered from the main storage supply container to a storage container 24. The impurities in the gas such as $H_2O$, $CO_2$, $O_2$ and $N_2$ are eliminated by a calcium furnace and a molecular sieve shown as purification system 22 inserted between the xenon supply 20 and the xenon storage 24. A desired amount of purified xenon contained in storage 24 is transferred to the open end of a length of thermoplastic tubing, the tubing being closed with a heat seal at the other end, as indicated at block 28. Metering system 26 determines the proper amount of xenon gas transfer. After the length of tubing has been filled, the other end of the tube is closed and the seeds formed by sealing the tubing and cutting the tubing at the desired points as shown at block 30. After the individual seeds have been formed, the seeds are stored until they are needed. Loading the seeds into the needle shown at 32 and implantation into the tissue at 34 may be accomplished when required.

The tubing used is preferably a heat sealable thermoplastic which must be gas impervious. A moisture impervious tubing is also preferred for some applications. Nylon has been used successfully, although it may require a coating for moisture resistance. "Kel-F" thermoplastic does not require coating.

Figures 3, 3A:
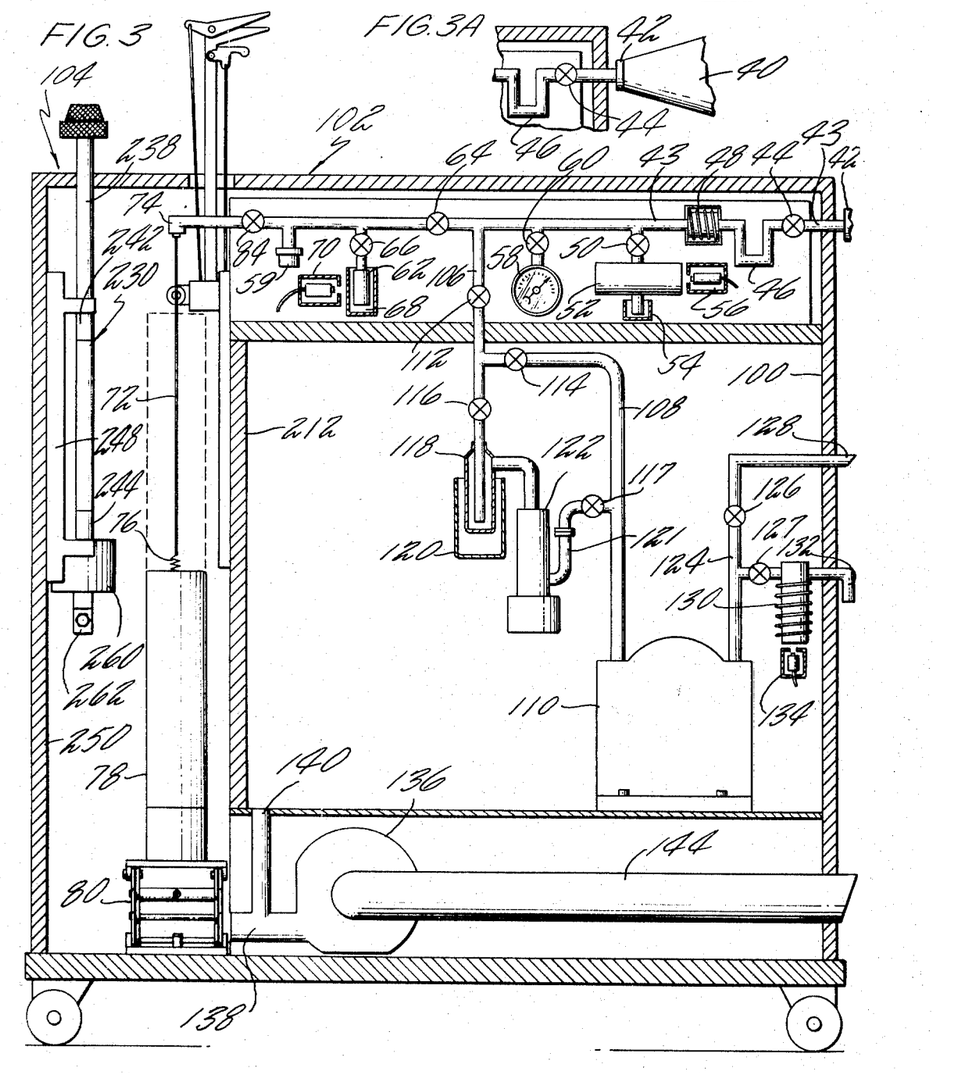
FIGURE 3 shows the preferred seed preparation apparatus.
FIGURE 3A shows details of the seed preparation apparatus of FIGURE 3.

FIGURES 3 and 4 show schematically the preferred embodiment of the xenon seed preparation apparatus. A self-contained unit performs the functions of purifying the xenon gas, metering the desired amount of gas and loading, sealing and cutting the seeds. The shipping container containing the xenon gas, either xenon 131, xenon 133 or a combination thereof, is shown at 40 connected to a inlet 42. The container 40 is opened by means of a valve, not shown, and the gas is pumped via line 43 through valve 44, molecular sieve 46 and calcium furnace 48 through valve 50 and into storage container 52. The entire gas transfer system including line 43 is initially evacuated by a vacuum pumping system to be described. The bottom portion of the storage container 52 sits in a Dewar 54 filled preferably with liquid nitrogen. The gas transfer from shipping container 40 to storage container 52 takes place by means of cryogenic pumping. The liquid nitrogen in Dewar 54 creates a lower pressure in storage container 52 than exists in shipping container 40, and the pressure gradient forces the gas into storage container 52.

The gas purification of the xenon takes place in the molecular sieve 46 and the calcium furnace 48. The hot calcium combines chemically with any oxygen and nitrogen impurities present in the xenon gas, while the molecular sieve eliminates water and carbon dioxide. Storage container 52 is large enough to contain all the gas originally supplied in shipping container 40, and acts as a reservoir to supply purified gas for further operations. A counter 56 such as a Geiger counter is positioned adjacent storage container 52 and produces an output signal indicative of the radioactivity in storage container 52, thereby giving an indication of the amount and activity of gas stored within the storage container.

A pressure gauge 58 is connected to the transfer line 43 through a valve 60. The pressure gauge 58 is used to determine the pressure in line 43 when it is originally evacuated, and may also be used to measure the pressure in storage container 52 and a metering container 62. A thermocouple gauge 59 is also connected to transfer line 43 and is used to measure vacuum during evacuation by pumping.

Prior to the encapsulating of the xenon gas in the thermoplastic tubing, the desired amount of gas is transferred from storage container 52 to metering container 62 through valves 50, 64 and 66. Metering container 62 is also surrounded by a Dewar 68 containing liquid nitrogen, and the transfer process between the storage container and the metering container is by cryogenic pumping as previously described. A Geiger counter 70 is positioned adjacent metering container 62 to determine the amount and activity of the gas in the metering container.

Once a sufficient amount of the gas has been transferred to metering container 62, valves 50 and 64 are closed. In preparation for making the seeds, one or more lengths of thermoplastic tubing 72 are sealed shut at one end with a short piece of metal containing a hole, or eye, securely attached to the sealed end. The tubing is then fitted to one or more vacuum headers 74 and hooked to a tensioning spring 76 through the eye provided. The tubing 72 is initially pumped down to the 1 micron range by the vacuum pumping system to be described subsequently.

A Dewar 78 containing liquid nitrogen is fixed upon a jack 80 which is itself connected through the wall of the enclosed seed preparation apparatus to a crank 82. Operation of crank 82 will raise Dewar 78 so that the Dewar completely surrounds tubing 72. Crank 82 and the valves within the system may be coupled through reach rods, not shown. Valve 84 in line 43 is then opened, and the xenon in the metering container 62 is cryogenically pumped through line 43 into tubing 72. When the gas transfer is complete, a seal is made at the upper end of the tubing 72 and the Dewar 78 lowered to its former position. The tubing 72 is now ready to be sealed into individual seeds. It is obvious that more than one unit of tubing may be processed simultaneously.

The entire seed preparation apparatus is enclosed in a lead shielded housing 100. The apparatus is divided into two sections, section 102 being the gas transfer portion and section 104 being the seed sealing portion.

The gas transfer line 43 through which the original xenon gas in shipping container 40 is transferred selectively to the plastic tubing 72 is connected through a line 106 and 108 to a pump 110. Valves 112 and 114 are connected in this line. When the valves 50, 60, 64, 66, 84, 112 and 114 are opened, and valves 44, 116 and 117 are closed, the pump 110 can be actuated to evacuate the entire gas transfer system including tubing 72 to a pressure of less than 100 microns. When the pump 110 has taken the system down to a pressure as low as the pump capacity will allow, valve 114 is closed and valves 116 and 117 are opened. Valves 116 and 117 connect line 106 with a cold trap 118 surrounded by a Dewar 120 and a diffusion pump 122. The diffusion pump 122 increases the pumping capacity of the system, and the cold trap 118 prevents the oil in the diffusion pump from flowing back into the gas transfer system. Pump 122 is connected to exhaust into line 108 by line 121. The output of the pump 110 is fed through a line 124 and through valve 126 to an outlet 128 situated outside the enclosure 100. As an alternative, valve 126 may be closed, a valve 127 opened, and the line 124 connected through a charcoal trap 130 to an exhaust 132. The charcoal trap 130 cleans the exhaust gas of any radioactivity therein, and is a safety feature. A counter 134 is situated adjacent trap 130 to determine the amount of radioactivity in the exhaust gas, an increase therein denoting a leak in the system. A refrigerating coil surrounds charcoal trap 130.

An exhaust blower 136 is connected through a line 138 to the seed forming portion 104 of the apparatus, and through a line 140 to the gas transfer portion of apparatus 100. The blower 136 is a large capacity suction system which withdraws any excess gas in the apparatus and pumps it to an exhaust line 144. The exhaust line will generally be continued to expel the air at a distance from the apparatus for safety reasons.

The radioactive xenon gas cryogenically pumped into plastic tubing 72 may be at a pressure up to approximately 3000 mm. With the cryogenic pumping, the xenon which is a solid at cryogenic temperatures coats the inside of the plastic tubing 72. This cryogenic pumping system is more efficient with xenon than with a pressure gas transfer system. The ease of transfer by cryogenic pumping is due to the vapor pressure of xenon, approximately 2 microns at 77° K.

Once the radioactive xenon is within the tubing 72, the tubing is heat sealed at its opened end to entrap the gas. The Dewar 78 is removed from the tubing by lowering the jack 80. As the temperature of the tubing 72 rises, the xenon expands within the tubing. The thermoplastic tubing is now ready to seal into individual seeds.

Figure 6:
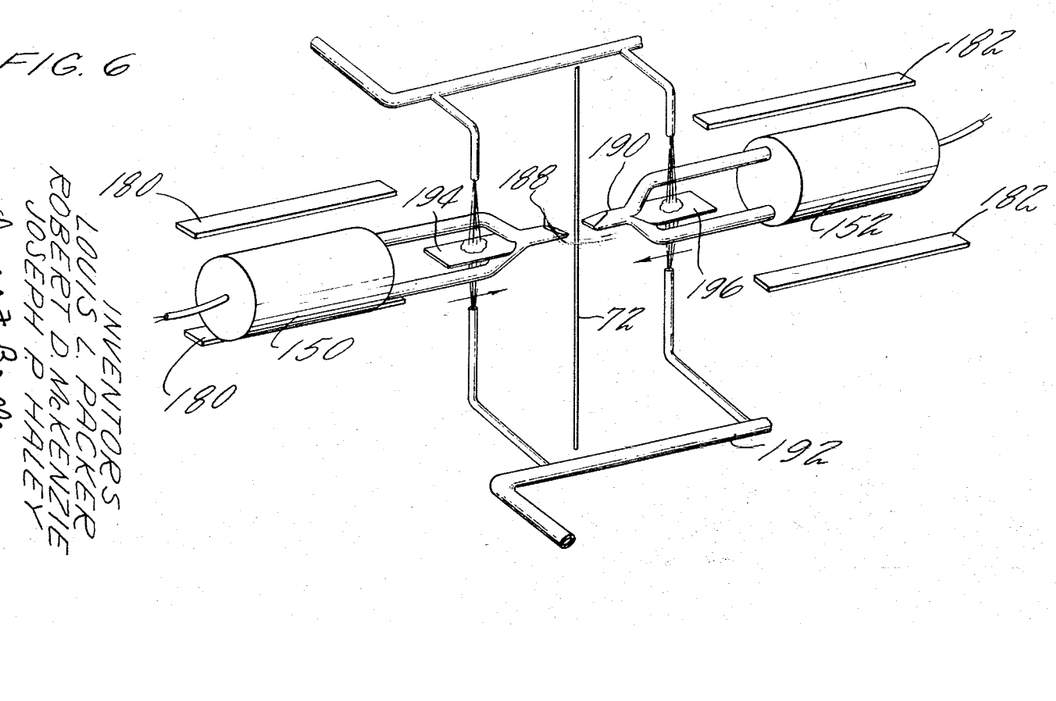
FIGURE 6 shows the details of the seed sealer.

The seed sealing mechanism is shown in FIGURE 4 and in FIGURE 6. A pair of impulse heating units 150 and 152 connected to an appropriate power supply are situated on either side of plastic tubing 72. Their heating cycle is controlled by a timer so that the exact temperature reached during the sealing operation is preadjustable to suit the type of thermoplastic tubing being used. When the seal has been made the heater tips may be cooled, as shown in FIGURE 6, by means of air forced through cooling air system 192 by a cool air supply, not shown, the cool air impinging on cooling fins 194 and 196 which are thermally connected to the heater tips 188 and 190. This operation minimizes the length of time the thermoplastic tubing 72 is held near its melting point.

Figure 7:
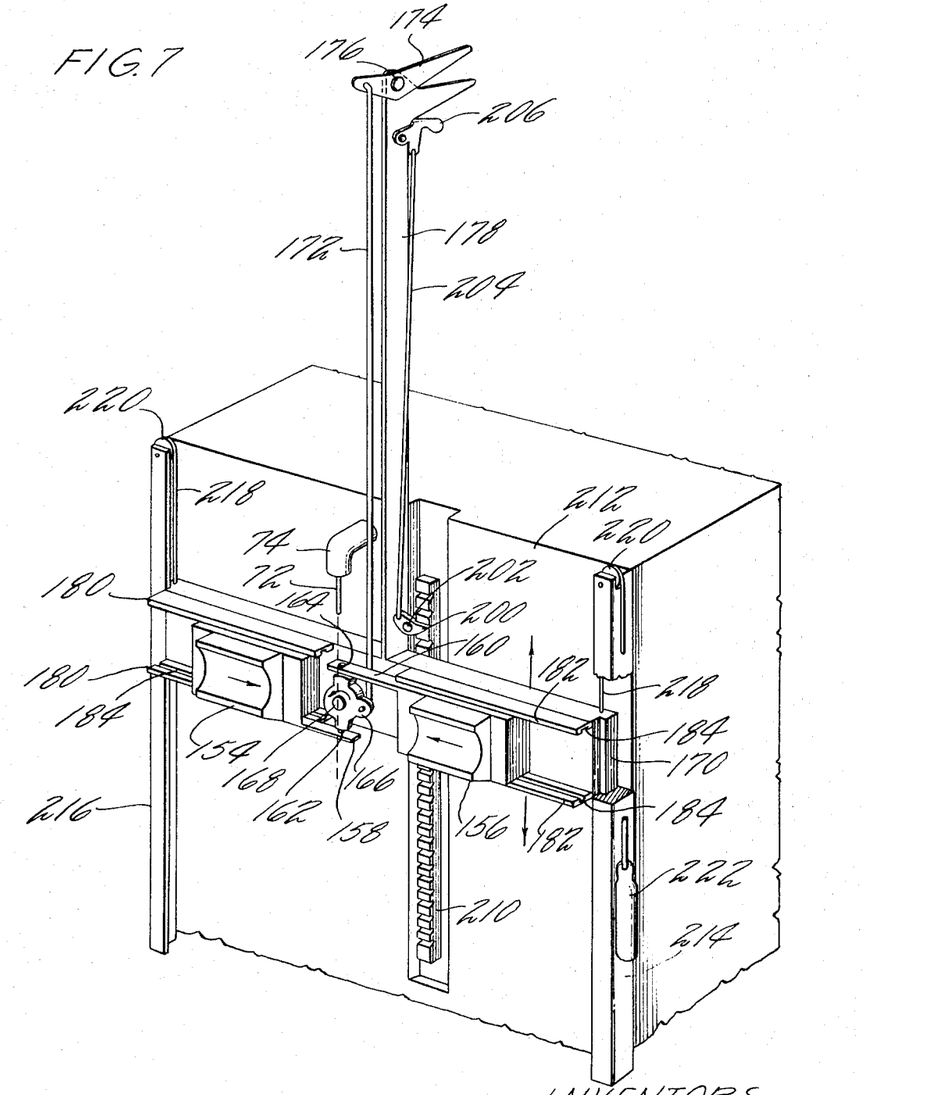
FIGURE 7 shows the details of the seed sealer indexing.

The intermittent impulse heating units are mounted on a pair of horizontally movable mounts 154 and 156 shown in FIGURE 7. Impulse heating unit mounts 154 and 156 have arms 158 and 160 having openings at the extremities thereof which are fixedly connected to pins 162 and 164 extending from double bellcrank 166. The bellcrank 166 is pivotable about shaft 168. Shaft 168 is secured through backing plate 170, the entire plate 170 being movable vertically as will be described. Also connected to double bellcrank 166 is an actuating arm 172 which is connected at its other end to a lever 174 pivoted at 176 to stationary arm 178 which is an extension of mounting plate 170. The top-most portion of arm 178 and lever 174 form a handle. When the handle is squeezed, i.e., when lever 174 is rotated about pivot 176, actuating arm 172 rotates double bellcrank 166 to thereupon move the heating unit mounts 154 and 156 inward so that the tips of the heating unit 150 and 152 mounted on the heater mounts, contact tubing 72 and form a positive seal thereon. Squeezing this handle may also actuate the previously-mentioned heating cycle timer and cooling air jets in proper sequence by means of microswitches, not shown, which may be mounted on arm 178. Heating unit mounts 154 and 156 are slidable along guide rails 180 and 182 which are mounted upon mounting plate 170. Heater mounts 154 and 156 move along grooves 184 in guide rails 180 and 182.

The entire heat sealing assembly is indexible vertically by means of a ratchet pawl 200 pivoted at shaft 202 upon arm 178. Actuating arm 204 extends from pawl 200 and is connected at its other end to ratchet trigger 206 also pivoted upon arm 178. A rack 210 is physically mounted upon wall 212 which separates chamber 104 from chamber 102. The entire mounting plate 170 is movable along vertical guide rails 214 and 216 by means of the ratchet pawl and rack in which the depressions of the rack are spaced to match the desired seed length. Mounting plate 170 is connected by means of cables 218 passing over pulleys 220 to counterweights 222 whereby actuation of ratchet trigger 206 allows the entire mounting plate with the heating units to be easily raised and lowered in a vertical direction along the guide rails.

In operation, when the plastic tubing has been filled with the proper amount of xenon gas, the mounting plate 170 with the heat sealing units attached thereto is raised vertically to its highest position along rack 210 by means of a ratchet trigger 206. In this position, seed sealer handle 174 is actuated to produce a seal by moving the heat-sealing units into contact with the plastic tubing 72. After the seal is made, the mounting plate 170 is repositioned along rack 210 and another seal is made by actuating the seed sealer handle. This process continues until the entire tubing 72 has been sealed to form a series of seeds. The sealing mechanism is positively located at each seal position by the ratchet to insure uniform seed length. The seals are made in proper sequence to provide uniform gas pressure within each seed.

When the separate seals have been made, a pivoted seed-cutting holder 230 is swung into place over the tubing and clamped. As seen best in FIGURES 4 and 5, the seed-cutting holder 230 is composed of two sections, 232 and 234, held together by means of a clamping screw 236. The seed-cutting holder is pivotable about an axis parallel to the plastic tubing 72 and is mounted on a hollow shaft 238 through which runs an internal shaft 240. Internal shaft 240 is journaled through a sleeve portion 242 of seed-cutting holder member 232 and also through sleeve 244 at the bottom portion of member 232. Shaft 240 is connected to knob 246 at one end, and seats upon member 248 at its opposite end. Member 248 is connected to wall 250 and also supports shaft 238 for movement as shown best in FIGURE 3. Seed-cutting holder member 234 is fixedly attached to shaft 240 for movement therewith.

Figure 5:
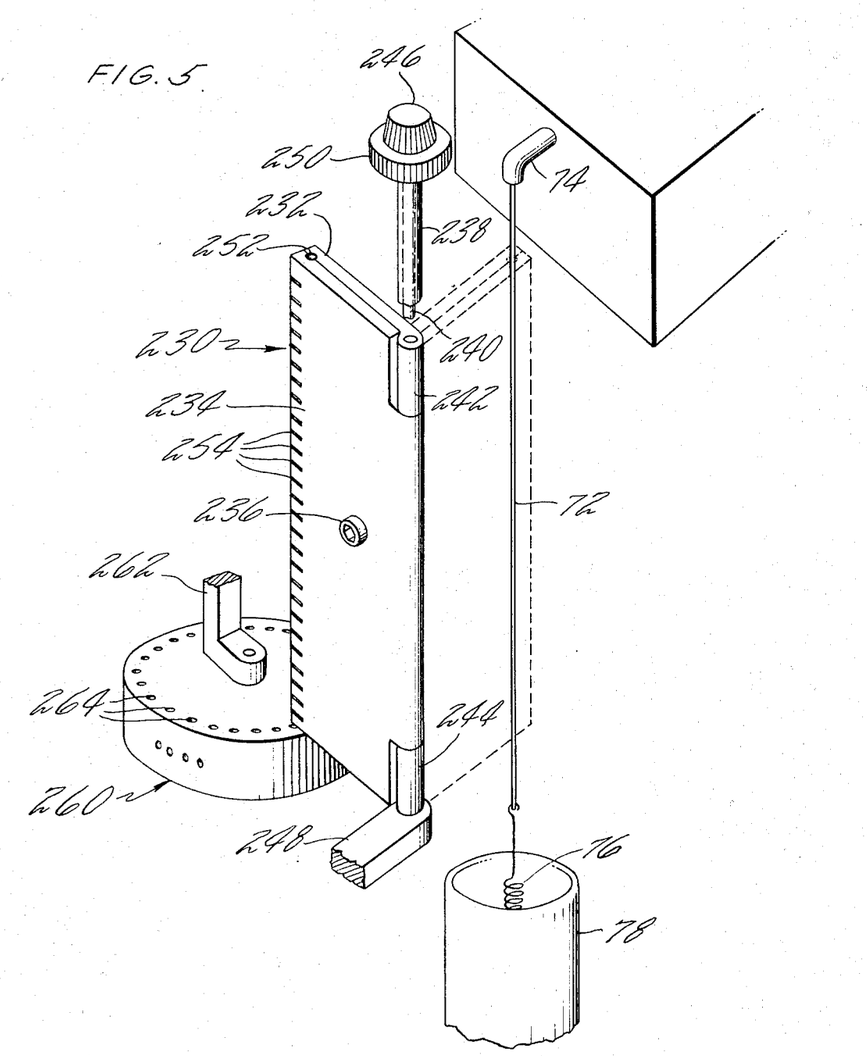
FIGURE 5 shows the details of construction of the seed-cutting holder of FIGURES 3 and 4.

External shaft 238 is fixedly attached to sleeve 242 of seed-cutting holder member 232. The other end of shaft 238 is connected to knob 250 concentric with knob 246. Seed-cutting holder members 232 and 234 are so shaped that when butted together a slot 252 is present through the length of the seed-cutting holder wherein plastic tubing 72 may be contained.

In operation, after the xenon gas has been transferred into plastic tubing 72, and after the sealing has taken place, the two sections 232 and 234 of seed-cutting holder 230, which have previously been located one on each side of plastic tubing 72, are brought together by rotating knobs 246 and 250, and clamped with screw 236, so that plastic tubing 72 is enclosed in slot 252. Plastic tubing 72 is then removed from header 74 and spring 76 as by cutting.

A series of slits 254 exists along one side of seed-cutting holder 230. The slits in the seed-cutting holder are spaced to align with the seals in the tubing, and each seed may be properly severed from its neighbor at the center point of the seal by such means as a knife inserted into each slit.

A loading cylinder 260 is positioned beneath the seed-cutting holder. The cylinder 260 is rotatable about journals 262 which are clamped to a wall of the apparatus. The cylinder 260 has a circle of holes therein in which each individual seed may be located. Since the seed-cutting holder is free to pivot to its previous position once the seeds are cut, it is now swung back and positioned with the center line of the seed column or slot 252 directly over the loading cylinder 260. The clamping screw 236 on the seed holder is now loosened to permit the seeds to slide in the slot or column 252, and a loading stylus 266 is inserted into the slot 252 from above. The stylus is graduated to the exact seed length so that upon pushing it down one increment, one seed is ejected from the lower end of the column. Since the loading cylinder 260 is positioned directly below the lower end of the column of seeds, each ejected seed is pushed into one of the holes 264 which may contain the upper end of an implantation needle. After loading one seed, the cylinder may be rotated until the next empty slot 264 containing a needle is in position, as indicated by a detent and notch system, and the stylus may be depressed again to load the next seed into the next needle.

Alternatively, needles may be omitted at this point, and the seeds transferred directly into the holes in the loading cylinder, which may then serve as a temporary storage unit for them. The loading cylinder 260 may subsequently be used to transport the seeds into an operating room and used to supply seeds to be used in other implantation techniques, as afterloading.

When all seeds are loaded into the needles, the needles can be stored in the cylinder 260 until used, or removed to storage blocks if desired. Lead hand shields with set screw collars can be attached to the loaded needles for handling, if necessary.

Figure 8:
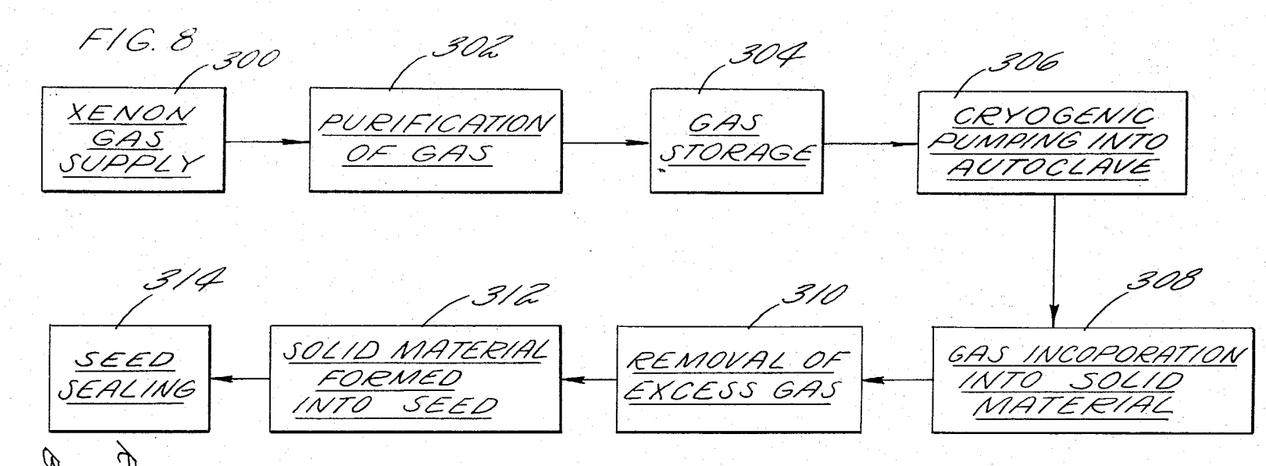
FIGURE 8 is a block diagram of an alternate seed preparation method.

Another method for forming radioactive xenon seeds is shown in block diagram form in FIGURE 8. The basic concept is a means to achieve higher gas concentrations in xenon seeds by incorporating the gas into a solid material. It is well known that gas can be permeated into a solid, adsorbed on the surface of a solid, or encapsulated in inorganic material. See for example "Argon, Helium, and The Rare Gases" by G. Cook. Once the radioactive xenon gas is incorporated into a solid material, this solid material whether in the form of a power or a solid mass may be stamped, pressed, or encapsulated into the desired shape. Encapsulation may be required to insure a waterproof and gas-tight enclosure.

The above reference indicates that up to 1000 millicuries per cubic millimeter is possible with dehydrated crystalline aluminosilicates, a zeolite powder, using a molecular sieve. Although this is possible, radiation damage limitations would probably reduce the specific activity to approximately 100 to 200 millicuries per cubic millimeter. This represents four to eight times the gas concentrations that can be achieved by encapsulating a radioactive gas at two or three atmospheres by cryogenic pumping. The advantages of this higher concentration are an increase in shelf-life of the seed by 10 to 20 days, or the ability to make a smaller seed.

Referring now to FIGURE 8, the radioactive xenon gas in gas supply 300 is purified as previously described in a purification system 302. The purified gas is then stored in a storage container at 304. The desired amount of purified radioactive gas is then cryogenically pumped into an autoclave at 306. Metering apparatus may be used as previously described.

When the gas is cryogenically pumped into the autoclave, it is highly concentrated. When the liquid nitrogen used in the cryogenic pumping is removed, the xenon gas expands as the temperature rises.

The xenon gas may be incorporated into a solid material by a number of different techniques, including encapsulation in a zeolite, adsorption in a zeolite, or permeation into a solid such as a plastic.

For encapsulation of the xenon gas in a zeolite or other suitable material, the gas is heated in the autoclave with the desired zeolite to achieve a pressure of approximately 30,000 p.s.i. at a temperature of about 300° C. As the temperature rises, the zeolite molecules open and the gas molecules are able to penetrate the zeolite. As the mixture is cooled, the zeolite molecules contact and trap an amount of xenon gas within the zeolite material.

The xenon gas may also be adsorbed into the zeolite or other suitable material. In this process the xenon gas is cryogenically pumped into the autoclave which also contains the zeolite material. The xenon is permitted to expand within the gas-tight enclosure to standard temperature and pressure conditions. With the xenon atmosphere present within the autoclave, the xenon gas is adsorbed into the crystalline zeolite structure. With this approach a xenon atmosphere is required while the zeolite is packaged into the seed as will be described.

Another technique for incorporating the radio-active xenon gas into a solid material is by permeating the gas into a solid, preferably a plastic such as "Kel-F." With this approach the xenon in the autoclave is heated with the desired material to a temperature of about 300° C. at a pressure of 30,000 p.s.i. The xenon gas will permeate the pores of the plastic and a sufficient amount with remain within the pores even when the pressure and excess gas is removed.

After the gas is incorporated into the solid material by the desired method as illustrated by block 308, the excess xenon gas is removed, shown in block 310, and the solid material is formed into the seed as illustrated by block 312. The gas is not removed, however, when the zeolite adsorption technique is used.

The solid material may be in the form of a powder or a larger solid mass. Any known method of forming the solid into a compact mass may be used to form the seed, and may require pellet forming dies, mechanical handling, weighing, etc. The powder form may be compacted in a tube.

Sealing of the solid material is shown at block 314, and is the step of forming a water and/or gas-tight seal or cover over the seed if necessary. When the gas is encapsulated in a zeolite, only the water-tight seal is necessary. For the adsorbed zeolite, a xenon gas atmosphere is necessary during packaging, and therefore a water and gas-tight seal is necessary. Sealing may be performed by applying or spraying the solid seed with a thermoplastic, or by enclosing the seed in a tube. If the solid is a powder, the seed formation and sealing may be combined in one step.

Although this invention has been described in its preferred form, it is obvious that numerous additions and modifications may be made to the teachings contained herein without departing from the inventive concepts as hereinafter claimed.

We claim:
1. A radioactive seed for the treatment of living tissue comprising:
   a gas and moisture impervious chemically inert cylindrical hollow tubing of thermoplastic material, said tubing being approximately 4 mm. long and 0.7 mm. in inside diameter, and having a wall thickness of approximately 0.15 mm. and an internal volume of approximately 1 mm.$^3$,
   and a radioactive xenon gas of a purity sufficient to provide a specific activity of between 10 and 40 millicuries/cm.$^3$ and to produce a radiation dosage of about 1000 roentgens being enclosed in said tubing at a pressure of up to 3000 mm. of mercury,
   the ends of said tubing being heat sealed to cause the walls of said tubing to adhere in a gas tight seal and being shaped to facilitate insertion into living tissue.

2. A radioactive seed as in claim 1 in which said xenon gas is xenon 133.

3. A radioactive seed as in claim 1 in which said xenon gas is xenon 131.

4. A radioactive seed as in claim 1 in which said xenon gas is incorporated into a solid material enclosed within said seed.

References Cited

UNITED STATES PATENTS

| | | | |
|---|---|---|---|
| 1,406,509 | 2/1922 | Viol | 250—106.5 |
| 2,269,458 | 1/1942 | Kahn | 250—106.5 |
| 2,516,261 | 7/1950 | Schutt | 128—1.2 |
| 2,884,538 | 4/1959 | Swift | 250—83.6 |
| 2,975,113 | 3/1961 | Gordon | 204—154 |
| 3,060,924 | 10/1962 | Rush | 128—1.2 |
| 3,224,432 | 12/1965 | Billingsley | 128—1.2 |
| 3,231,739 | 1/1966 | Danforth et al. | 250—106.5 |

RALPH G. NILSON, *Primary Examiner.*

SAUL ELBAUM, *Assistant Examiner.*

U.S. Cl. X.R.

128—264; 250—106